Figure 1:
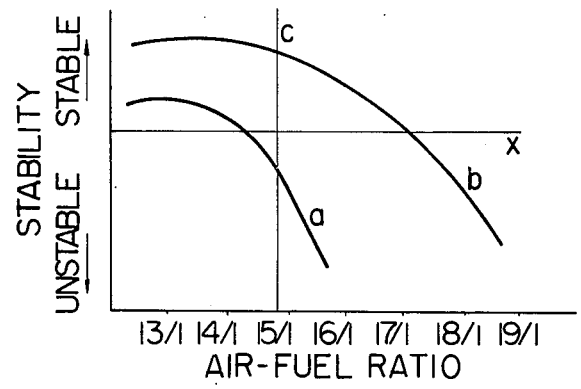

United States Patent [19]

Saito et al.

[11] 4,075,834
[45] Feb. 28, 1978

[54] AIR-FUEL RATIO CONTROL ADJUSTING SYSTEM IN AN INTERNAL COMBUSTION ENGINE

[75] Inventors: Masaaki Saito; Hidehiro Minami, both of Yokohama, Japan

[73] Assignee: Nissan Motor Company, Limited, Japan

[21] Appl. No.: 637,311

[22] Filed: Dec. 3, 1975

[30] Foreign Application Priority Data

Dec. 6, 1974 Japan ............................ 49-140253

[51] Int. Cl.² ........................................ F02B 75/10
[52] U.S. Cl. ................................ 60/276; 60/285; 60/290; 60/293
[58] Field of Search ............... 60/276, 293, 285, 289, 60/290

[56] References Cited

U.S. PATENT DOCUMENTS

| 3,738,109 | 6/1973 | Tatsutomi | 60/290 |
|---|---|---|---|
| 3,745,768 | 7/1973 | Zechnall | 60/285 |
| 3,751,915 | 8/1973 | Ranft | 60/293 |
| 3,832,848 | 9/1974 | Scholl | 60/276 |
| 3,885,540 | 5/1975 | Stadler | 123/119 A |
| 4,007,718 | 2/1977 | Laprade | 60/285 |

Primary Examiner—Douglas Hart
Attorney, Agent, or Firm—Lowe, King, Price & Markva

[57] ABSTRACT

Secondary air is fed into the engine exhaust gas passageway at a position upstream of an oxygen sensor to cause the electric air-fuel ratio control device and the air-fuel mixture generator to provide an air-fuel mixture having an air-fuel ratio lower than a set desired air-fuel ratio during idle and slow speed running of the engine.

5 Claims, 2 Drawing Figures

AIR-FUEL RATIO CONTROL ADJUSTING SYSTEM IN AN INTERNAL COMBUSTION ENGINE

The present invention relates generally to a device for feedback controlling the air-fuel ratio of an air-fuel mixture for an internal combustion engine to a desired air-fuel ratio and particularly to an air-fuel ratio control adjusting system for causing the air-fuel ratio feedback control device to temporarily control the air-fuel ratio of an air-fuel mixture for the engine to an air-fuel ratio different from the desired air-fuel ratio by supplying additional fluid into engine exhaust gases during a specific operation of the engine.

As is well known in the art, an exhaust gas catalytic converter has been in recent years provided with a ternary catalyst which concurrently catalytically promotes both oxidation of noxious components such as hydrocarbons (HC) and carbon monoxide (CO) present in exhaust gases discharged from an internal combustion engine and reduction of other noxious component such as nitrogen oxides ($NO_x$) to render these noxious components harmless. The ternary catalyst exhibits most effectively the above-mentioned function only when the air-fuel ratio of an air-fuel mixture for filling a combustion chamber of the engine or, in the event that secondary air is fed into the engine exhaust gas passageway, an integrated or total air-fuel ratio, i.e., the ratio by weight of the sum of air in the air-fuel mixture and the secondary air to fuel in the mixture is a stoichiometric air-fuel ratio (14.8:1) or an air-fuel ratio within an extremely narrow range including it.

Thus, the engine has been provided with an electric air-fuel ratio control device for accurately controlling the air-fuel ratio of an air-fuel mixture for the engine. This device comprises a sensor located in an engine exhaust gas passageway and generates an output signal representing the concentration of a component, contained in the engine exhaust gases, which concentration depends on the air-fuel ratio of an air-fuel mixture burned in the combustion chamber of the engine, and an electric control circuit for controlling the flow of fuel from a fuel supply device of the engine into air fed into the combustion chamber of the engine, in dependence on a difference between the output signal of the sensor and a reference signal representing a desired air-fuel ratio such as, for example, the stoichiometric air-fuel ratio to electrically control the air-fuel ratio of an air-fuel mixture for the engine to the desired air-fuel ratio.

However, when the air-fuel ratio of an air-fuel mixture for the engine is maintained at the stoichiometric air-fuel ratio, the air-fuel mixture is too lean for stable operation of the engine during its idle and slow speed running. The operation of the engine is most stable when the air-fuel ratio of the air-fuel mixture for the engine is within the range between, for example, 13/1 and 14/1, when fuel is gasoline and the stability of the operation of the engine is abruptly reduced when the air-fuel ratio of the air-fuel mixture is above 14/1 during idle and slow speed running of the engine. Accordingly, it is necessary or desirable to keep the air-fuel ratio of the air-fuel mixture lower than the stoichiometric air-fuel ratio, for example, at a value within the range between 13/1 and 14/1 during idle and slow speed running of the engine.

One solution to the problem is to make the electric air-fuel ratio control device inoperative or dormant and to enrich the air-fuel mixture for the engine over the stoichiometric air-fuel mixture during idle and slow speed running of the engine. However, this solution is undesirable because the exhaust gas purifying function of the ternary catalyst is reduced although the stability of operation of the engine is secured.

It is, therefore, an object of the invention to provide an air-fuel ratio control adjusting system which causes the electric air-fuel ratio control device to temporarily reduce the air-fuel ratio of an air-fuel mixture for the engine to a value lower than a set or desired air-fuel ratio (for example, the stoichiometric air-fuel ratio) by supplying secondary air into the engine exhaust gases so that the combustion chambers of the engine are filled by an air-fuel mixture enriched to below the stoichiometric air-fuel mixture to secure the stability of operation thereof and the ratio of the air in the mixture plus the secondary air to fuel is maintained at the stoichiometric air-fuel ratio to keep the exhaust gas purifying function of the ternary catalyst most effective during idle and slow speed running of the engine.

Figure 2:
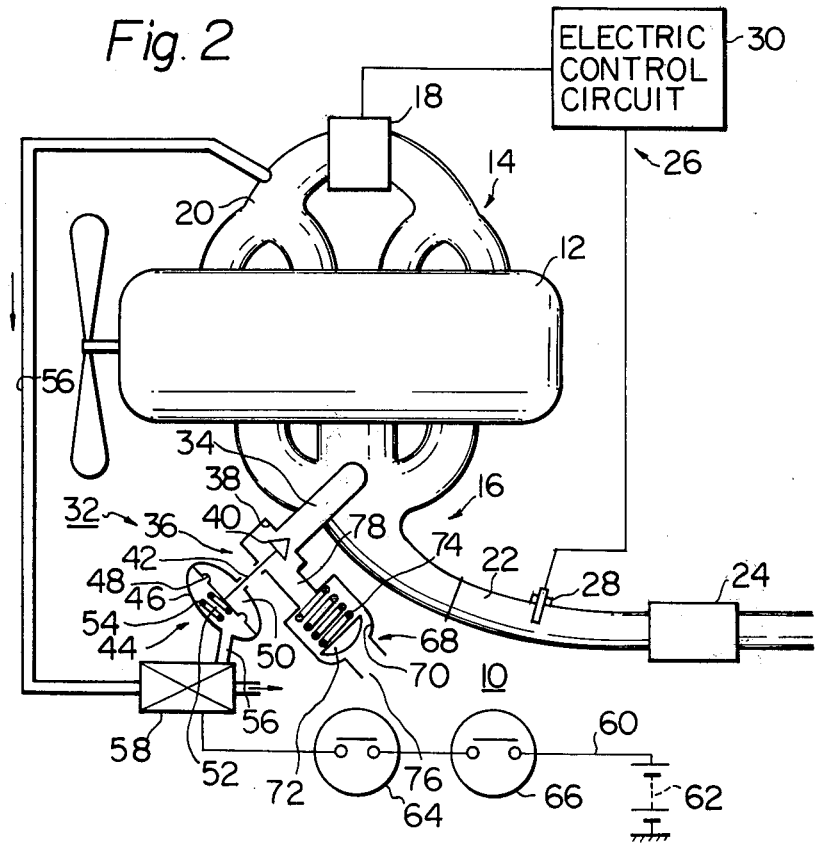

This and other objects and advantages of the invention will become more apparent from the following detailed description taken in conjunction with the accompanying drawings in which:

FIG. 1 is a graphic representation of the relationship between the air-fuel ratio of an air-fuel mixture for the engine and the stability of operation of the engine, and FIG. 2 is a schematic view of a preferred embodiment of an air-fuel ratio control adjusting system according to the invention.

Referring to FIG. 1 of the drawings, there is shown the relationship between the air-fuel ratio of an air-fuel mixture for filling a combustion chamber of an internal combustion engine in which gasoline is employed as fuel and the stability of operation of the engine as per the introduction of the present specification. In FIG. 1, the axis of abscissa represents the air-fuel ratio, while the axis of ordinate represents the stability of operation of the engine. The stability of operation of the engine is shown to increase from a lower portion to an upper portion as shown by arrows. The curve a shows the relationship during idle and slow speed running of the engine and the curve b shows the relationship during engine operating conditions other than idle and slow speed running. The line c shows the stoichiometric air-fuel ratio and the line x shows an allowable stability limit line. As is apparent from FIG. 1, the operation of the engine is most stable when the air-fuel ratio is within the range between 13/1 and 14/1 during idle and slow speed running of the engine and the stability of operation of the engine is abruptly reduced when the air-fuel ratio is above 14/1.

Referring to FIG. 2 of the drawings, there is shown an air-fuel ratio control adjusting system according to the invention, generally designated by the reference numeral 10, and an internal combustion engine 12 including intake and exhaust systems 14 and 16 which are combined with the air-fuel ratio control adjusting system 10. The intake system 14 is shown as including an air-fuel mixture forming or generating device 18 for supplying fuel into air fed into combustion chambers (not shown) of the engine 12 to form an air-fuel mixture therefor and which in this embodiment is a conventional but electronically controlled carburetor, and an intake manifold 20 which extends from the carburetor 18 to intake ports of the combustion chambers of the engine 12. The exhaust system 16 is shown as including an exhaust gas passageway 22 extending from exhaust ports (not shown) of the combustion chambers of the engine 12 to the outside atmosphere, and an exhaust gas catalytic converter 24 located in the exhaust gas passageway 22. The catalytic converter 24 contains therein a ternary or three-way catalyst (not shown) which serves to concurrently catalytically promote both oxidation of one portion of noxious components, i.e. hydrocarbons (HC) and carbon monoxide (CO), present in exhaust gases discharged from the engine 10 and reduction of another portion of the noxious components, i.e., nitrogen oxides ($NO_x$) to render these noxious components harmless.

The air-fuel ratio control adjusting system 10 is also combined with a conventional device 26 for electrically controlling the air-fuel ratio of an air-fuel mixture for filling the combustion chambers of the engine 12 to a desired value which is, for example, a stoichiometric air-fuel ratio in this embodiment. The electric air-fuel ratio control device 26 comprises sensing means 28 such as, for example, an oxygen sensor, carbon monoxide sensor, carbon dioxide sensor, hydrocarbon sensor or nitrogen oxide sensor which is located in the exhaust gas passageway 22 at a location upstream of the catalytic reactor 24 and senses the concentration of a component such as, for example, oxygen ($O_2$), carbon monoxide (CO), carbon dioxide ($CO_2$), hydrocarbon (HC) or nitrogen oxide ($NO_x$) contained in the engine exhaust gases which is closely related to the air-fuel ratio (i.e., the ratio by weight of air to fuel) of the air-fuel mixture filled and burned in the combustion chambers of the engine 12. The concentration of the sensed component varies with the air-fuel ratio of the air-fuel mixture. The oxygen sensor employed in this embodiment comprises a hollow member made of, for example, zirconium dioxide. The oxygen sensor 28 generates an electric output signal having a magnitude representing the sensed concentration of oxygen. The concentration of oxygen increases with increases in the air-fuel ratio by weight of the air-fuel mixture filled and combusted in the engine 12. The output signal of the oxygen sensor 28 is applied to an electric control circuit 30 electrically connected to the oxygen sensor 28. The control circuit 30 compares the magnitude of the applied signal with the magnitude of a reference signal or voltage which represents a desired or set air-fuel ratio. The desired or set air-fuel ratio is equal to a stoichiometric air-fuel ratio in this embodiment. The control circuit 30 generates an electric error signal having a magnitude representing a differential value between the magnitudes of the applied signal and the reference signal. The control circuit 30 is electrically connected to the carburetor 18 to apply the error signal thereto to control the flow of fuel into air fed into the combustion chambers of the engine 12 in dependence on the error signal to thereby control the air-fuel ratio of the air-fuel mixture for filling the combustion chambers of the engine 12 to the desired air-fuel ratio. The carburetor 18 includes, for example, a flow control valve of an on-off type (not shown) which is operated by a solenoid electrically connected to the control circuit 30 and is provided in a fuel passage or an air passage vented to the atmosphere and connected to the fuel passage to open and close the fuel or air passage. The ratio of open time and closed time of the control valve is varied in dependence on the error signal of the control circuit 30 to control the flow or fuel or air fed from the carburetor 18 to thereby increase or reduce the air-fuel ratio of the air-fuel mixture for the engine 12 to the desired air-fuel ratio.

The air-fuel ratio control adjusting system 10 comprises an additional fluid supply device 32 for supplying additional fluid, in this embodiment, air, into the engine exhaust gas passageway at a position upstream of the sensing means 28 to increase the concentration of oxygen in the engine exhaust gases sensed by the sensing means 28 to cause the electric air-fuel ratio control device 26 to temporarily enrich the air-fuel mixture for the engine 12 to have an air-fuel ratio lower than the set or desired air-fuel ratio during a specific operation of the engine 12.

The additional fluid supply device 32 comprises passage means 34 opening at one end into the exhaust gas passageway 22 at a position upstream of the oxygen sensor 28 and supplying into engine exhaust gases additional fluid which is secondary air in this embodiment. The other end of the passage means 34 may communicate with an outlet or discharge port of an air pump (not shown) to pump secondary air under pressure into the exhaust gas passageway 22 by way of the passage means 34. Alternatively, the other end of the passage means 34 may open into the outside atmosphere to directly communicate with it. In this instance, atmospheric air is drawn into engine exhaust gases by a vacuum cyclically produced in the exhaust gas passageway 22.

A flow control valve 36 is disposed in the passage means 34 and comprises a valve seat 38 formed in the passage means 34, a valve head 40 movable to seat on and unseat from the valve seat 38 to close and open the passage means 34, and a valve stem 42 extending from the valve head 40 externally of the passage means 34.

An actuator 44 is provided for operating the flow control valve 36 and comprises a diaphragm unit including a housing 46, and a pressure sensitive deformable partition member such as a flexible diaphragm 48 dividing the interior of the housing 46 into first and second chambers 50 and 52. The valve stem 42 extends into the first chamber 50 and is fixedly secured to the center of the diaphragm 48. A compression spring 54 is located in the second chamber 52 and urges the diaphragm 48 into a position in which the valve 36 closes the passage means 34. The first chamber 50 communicates with the outside atmosphere, while the second chamber 52 communicates alternatively with the intake manifold 20 by way of a conduit 56 and with the outside atmosphere.

A solenoid operated control valve 58 is provided in the conduit 56 to switch over the pressure in the second chamber 52 of the actuator 44 between the intake manifold vacuum and the atmospheric pressure. The valve 58 is operable to obstruct fluid communication between the second chamber 52 and the outside atmosphere and provide fluid communication between the second chamber 52 and the intake manifold 20 to cause the flow control valve 36 to open the passage means 34 during idling and slow speed operations of the engine 12 and to obstruct fluid communication between the second chamber 52 and the intake manifold 20 and provide fluid communication between the second chamber 52 and the outside atmosphere to cause the flow control valve 36 to close the passage means 34 during engine running conditions other than idling and slow speed operations. The solenoid (not shown) of the valve 58 is electrically connected to an electric control circuit 60 which includes therein an electric power source 62 such as a battery, and throttle and vehicle speed switches 64 and 66 interposed in series between the solenoid and the electric power source 62. The throttle switch 64 responds to the degree of opening of a throttle valve (not shown) of the carburetor 18 and is closed only when the throttle valve is opened, for example, below 2 or 3 degrees. The vehicle speed switch 66 responds to the speed of a motor vehicle equipped with the engine 12 and is closed only when the vehicle runs at a speed, for example, below 10 kilometers per hour.

A check valve 68 is provided in the passage means 34 at a position upstream of the flow control valve 36 and comprises a valve seat 70 formed perpendicularly to and in the passage means 34, a valve head 72 seatable on the valve seat 70 to close the passage means 34, and a compression spring 74 urging the valve head 72 against the valve seat 70. The check valve 68 is operable to open the passage means 34 to permit secondary air to flow to the exhaust gas passageway 22 when the pressure in an upstream portion 76 is above the pressure in a downstream portion 78 and to close the passage means 34 to prevent flow of the engine exhaust gases from the portion 48 to the portion 76 when the pressure in the portion 76 is below the pressure in the portion 78.

The amount of secondary air fed into the exhaust gas passageway 22 is metered to a value to cause the electric air-fuel ratio control device 26 to control the air-fuel ratio of the air-fuel mixture drawn into the engine 12 to a value within a range between, for example, when fuel is gasoline, 13/1 and 14/1, by adjusting the degree of opening of the flow control valve 36 or in another suitable manner such as by means of an orifice (not shown) formed in the passage means 34.

The air-fuel ratio control adjusting system 10 thus far described is operated as follows:

When the engine 12 is idling or running at a slow speed, both switches 64 and 66 are closed to energize the solenoid of the valve 58. The valve 58 is operated by energization of the solenoid so that the second chamber 52 of the actuator 44 is isolated from the outside atmosphere and communicates with the intake manifold 20. Intake manifold vacuum is admitted to the chamber 52 to cause the diaphragm 48 to move by the pressure difference between the chambers 50 and 52, overcoming the force of the spring 54, into a position in which the flow control valve 36 opens the passage means 34. Secondary air is fed into the engine exhaust gases through the passage means 34 so that the concentration of oxygen contained in the engine exhaust gases is increased by oxygen from the secondary air added. The increased oxygen concentration represents an integrated or total air-fuel ratio, i.e., the ratio by weight of the sum of the air in the air-fuel mixture burned in the engine combustion chamber and the added secondary air to the fuel in the air-fuel mixture. The oxygen sensor 28 senses the increased oxygen concentration and generates an output signal representing the integrated air-fuel ratio. The output signal of the oxygen sensor 28 is applied to the control circuit 30 and is compared with the reference signal representing the stoichiometric air-fuel ratio. The control circuit 30 generates an error signal representing the difference between the integrated air-fuel ratio and the stoichiometric air-fuel ratio. The error signal is applied to the carburetor 18 to cause it to feed fuel necessary for reducing the integrated air-fuel ratio to the stoichiometric air-fuel ratio. The integrated air-fuel ratio is higher by the secondary air than an actual air-fuel ratio, i.e., the air-fuel ratio of the actual air-fuel mixture burned in the engine combustion chamber. Accordingly, the carburetor 18 is forced by the error signal to feed an excessive fuel which depends on the secondary air and which is equal to the fuel amount difference between the actual air-fuel mixture and a false or hypothetical air-fuel mixture having the integrated air-fuel ratio, as compared with when no secondary air is fed into the engine exhaust gas passageway 22. Accordingly, the air-fuel mixture provided for the engine 12 is enriched by the excessive fuel over the stoichiometric air-fuel mixture and has an air-fuel ratio lower than the stoichiometric air-fuel ratio by the excessive fuel. Thus, the running of the engine 12 is stabilized. Furthermore, since the integrated air-fuel ratio of the air in the mixture provided for the engine 12 plus the secondary air to fuel in the mixture is the stoichiometric air-fuel ratio, the exhaust gas purification in the ternary catalyst is maintained most effective.

The air-fuel ratio of the enriched air-fuel mixture is determined by selecting the amount of the secondary air fed and is a value within the range between 13/1 and 14/1 in this embodiment.

When the engine 12 is in a normally operating condition other than idling and slow speed operations, at least one of the switches 64 and 66 is opened to deenergize the solenoid of the valve 58. As a result, the valve 58 is in a position in which the second chamber 52 of the actuator 44 is isolated from the intake manifold 20 and communicates with the outside atmosphere. Atmospheric pressure is admitted to the chamber 52 to permit the spring 54 to force the diaphragm 48 to a position in which the flow control valve 36 closes the passage means 34. Secondary air is prevented by the flow control valve 36 from entering the exhaust gas passageway 22. Accordingly, the air-fuel ratio of an air-fuel mixture for filling the combustion chambers of the engine 12 is controlled to the desired air-fuel ratio, i.e., the stoichiometric air-fuel ratio, by the electric air-fuel ratio control device 26.

An electronically controlled fuel injection device may be employed as the air-fuel mixture forming device in place of the carburetor 18. In this instance, the control circuit 30 is electrically connected to the fuel injection device to apply the error signal thereto to control the amount of fuel, injected from the fuel injection device, in dependence on the error signal, similarly as previously described.

Although a flow control valve operated by a solenoid may be employed in place of the flow control valve 36 operated by the diaphragm unit 44, there is an advantage that the amounts of secondary air fed into the engine exhaust gases and accordingly the air-fuel ratios of air-fuel mixtures drawn into the engine 12 can be differentiated by intake manifold vacuum from each other between idle and slow speed running of the engine 12 when a flow control valve is operated by intake manifold vacuum so that the air-fuel ratios of the air-fuel mixtures are more accurately controlled as compared with a flow control valve operated by a solenoid.

An intake manifold vacuum sensitive booster switch, or a neutral switch sensitive to a neutral condition of the transmission of the vehicle can be employed singly or in combination of two in place of the switches 64 and 66.

When a sensor other than an oxygen sensor is employed which senses the concentration of a component contained in the engine exhaust gases, which is not contained in secondary air, since the concentration of the component sensed by the sensor is reduced by secondary air fed into the engine exhaust gases, the electric air-fuel ratio control device 26 causes the air-fuel mixture generator 18 to increase the air-fuel ratio of an air-fuel mixture for the engine 12 to a value higher than the set or desired air-fuel ratio, for example, the stoichiometric air-fuel ratio, so that a lean air-fuel mixture is provided for the engine 12 and the integrated air-fuel ratio of the lean air-fuel mixture and the secondary air added is maintained at the desired air-fuel ratio to keep the exhaust gas purifying function of the ternary catalyst at maximum during a specific operation of the engine 12.

Although the invention has been described as being applied to the engine provided with a converter having a ternary catalyst, the invention may be applied to an engine provided with a converter having no ternary catalyst. In this instance, additional fluid other than secondary air may be fed into the engine exhaust gases by the additional fluid supply device 32. In this instance, when the additional fluid is similar to or contains the matter of a component sensed by the sensing means 28, an enriched air-fuel mixture having an air-fuel ratio lower than the desired air-fuel ratio is provided for the engine 12 by the air-fuel mixture forming device 18 and the electric air-fuel ratio control device 26. When the additional fluid is different from or does not contain the matter of the component sensed by the sensing means 28, a lean air-fuel mixture having an air-fuel ratio higher than the desired air-fuel ratio is provided for the engine 12 by the devices 18 and 26.

It will be appreciated that the invention provides an air-fuel ratio control adjusting system which comprises an additional fluid supply device supplying additional fluid into engine exhaust gases so that an air-fuel mixture having an air-fuel ratio higher or lower than a set or desired air-fuel ratio is temporarily provided for the engine by an air-fuel mixture forming device and an electric air-fuel ratio control device during a specific operation of the engine.

It will be also appreciated that the invention provides an air-fuel ratio control adjusting system comprising a secondary air supply device which is combined with an electric air-fuel ratio control device including an oxygen sensor and supplies secondary air into engine exhaust gases so that an air-fuel mixture having an air-fuel ratio lower than a set or desired air-fuel ratio is provided for the engine by an air-fuel mixture generating device 18 and an electric air-fuel ratio control device 26 and the integrated ratio of air in the mixture plus the secondary air vs. fuel in the mixture is maintained at the desired air-fuel ratio during idle and slow speed running of the engine.

What is claimed is:

1. An air-fuel ratio control adjusting system in combination with an internal combustion engine and a motor vehicle equipped with said engine, said engine including an intake passageway for feeding air into said engine, a throttle valve rotatably mounted in said intake passageway, an air-fuel mixture forming device communicating with said intake passageway for feeding fuel into air fed through said intake passageway to form an air-fuel mixture to be burned in said engine, and an exhaust gas passageway for conducting exhaust gas from said engine, said system comprising a device for electrically controlling the air-fuel ratio of said air-fuel mixture to a desired air-fuel ratio, a sensor located in said exhaust gas passageway for sensing a concentration of oxygen contained in the engine exhaust gas which concentration is a function of the air-fuel ratio of said air-fuel mixture burned in said engine, said sensor having means to generate an output signal having a value representative of the sensed concentration of said oxygen, an electric control circuit which is electrically connected to said sensor and compares the value of said output signal of said sensor with a reference value representative of said desired air-fuel ratio, and has means to generate an error signal representative of a difference between the value of said output signal and said reference value, and fuel flow control means which is integral with said air-fuel mixture forming device and is electrically connected to said control circuit to receive said error signal thereof and controls in accordance with said error signal the flow of fuel fed into said air to thereby control, to said desired air-fuel ratio, the air-fuel ratio of said air-fuel mixture formed by said air-fuel mixture forming device, and a secondary air supply device for feeding secondary air into said exhaust gas passageway during idling and slow speed running of said engine for increasing the concentration of said oxygen in said engine exhaust gas sensed by said sensor, said secondary air supply device thereby causing said fuel flow control means to temporarily increase the flow of fuel fed into said air to enrich said air-fuel mixture formed by said air-fuel mixture forming device, said secondary air supply device comprising passage means opening into said exhaust gas passageway in a position upstream of said sensor for supplying secondary air into said exhaust gas passageway, a throttle switch opened in response to a first degree of opening of said throttle valve which is above a predetermined value and closed in response to a second degree of opening of said throttle valve which is below said predetermined value and representative of idling and slow speed running of said engine, a vehicle speed switch opened in response to a first speed of said motor vehicle which is above a predetermined value and closed in response to a second speed of said motor vehicle which is below said predetermined value and is representative of idling and slow speed running of said engine, a flow control valve located in said passage means, and operating means connected to said throttle and vehicle speed switches for causing, in response to opening of at least one of said throttle and vehicle speed switches, said flow control valve to close said passage means to inhibit supply of said secondary air into said exhaust gas passageway and further causing, in response to closing of both said throttle and vehicle speed switches, said flow control valve to open said passage means to permit supply of said secondary air into said exhaust means to increase the concentration of said oxygen sensed by said sensor.

2. An air-fuel ratio control adjusting system as claimed in claim 1, in which said operating means comprises an actuator, said flow control valve being located in said passage means and operable by intake manifold vacuum applied to said actuator to open to permit secondary air to pass into said engine exhaust gases during idle and slow speed running of said engine and by atmospheric pressure applied to said actuator to close to inhibit secondary air to pass into said engine exhaust gases during engine operating conditions other than idle and slow speed running, and a second control valve operable between a first position to cause application of intake manifold vacuum to said actuator and a second position to cause application of atmospheric pressure to said actuator.

3. An air-fuel ratio control adjusting system as claimed in claim 1, in which said secondary air supply device further comprises a check valve located in said passage means at a location upstream of said flow control valve and operable to open said passage means to permit secondary air to flow into said engine exhaust gases when the pressure on the engine exhaust gas side of said check valve is below the pressure on the opposite side thereof and to close said passage means to prevent flow of said engine exhaust gases into said opposite side when the pressure on said engine exhaust gas side is above the pressure on said opposite side.

4. An air-fuel ratio control adjusting system as claimed in claim 1, in which the above-mentioned fuel is gasoline and the air-fuel ratio of said air-fuel mixture enriched during idling and slow speed running of said engine is within the range between 13/1 and 14/1.

5. An air-fuel ratio control adjusting system as claimed in claim 1, in which said engine comprises an exhaust gas catalytic converter located in the flow of said engine exhaust gases at a position downstream of said sensor and containing therein a ternary catalyst which concurrently catalytically promotes both oxidation of hydrocarbons (HC) and carbon monoxide (CO) present in said engine exhaust gases and reduction of nitrogen oxides ($NO_x$) present in said engine exhaust gases, said desired air-fuel ratio being a stoichiometric air-fuel ratio.

* * * * *